US008351735B2

United States Patent
Biezen et al.

(10) Patent No.: US 8,351,735 B2
(45) Date of Patent: Jan. 8, 2013

(54) IMAGE PROCESSING SYSTEM, METHOD AND COMPUTER PROGRAM FOR CONTRAST ENHANCEMENT OF IMAGES

(75) Inventors: Paul Biezen, Eindhoven (NL); Johan Schirris, Veldhoven (NL); Sasa Cvetkovic, Eindhoven (NL)

(73) Assignee: Robert Bosch GmbH, Stuttgart (DE)

( * ) Notice: Subject to any disclaimer, the term of this patent is extended or adjusted under 35 U.S.C. 154(b) by 980 days.

(21) Appl. No.: 12/303,507

(22) PCT Filed: Oct. 18, 2006

(86) PCT No.: PCT/EP2006/067543
§ 371 (c)(1),
(2), (4) Date: Dec. 4, 2008

(87) PCT Pub. No.: WO2008/046450
PCT Pub. Date: Apr. 24, 2008

(65) Prior Publication Data
US 2009/0238486 A1 Sep. 24, 2009

(51) Int. Cl.
*G06K 9/40* (2006.01)
(52) U.S. Cl. .................................. 382/274; 382/260
(58) Field of Classification Search .................. 348/630, 348/678; 358/3.21; 382/114, 169, 260, 261, 382/263, 274, 276
See application file for complete search history.

(56) References Cited

U.S. PATENT DOCUMENTS

| 5,524,070 | A | 6/1996 | Shin et al. | |
|---|---|---|---|---|
| 7,835,588 | B2 * | 11/2010 | Parkkinen et al. | 382/274 |
| 8,000,551 | B2 * | 8/2011 | Arici et al. | 382/260 |
| 2001/0019633 | A1 * | 9/2001 | Tenze et al. | 382/261 |

(Continued)

FOREIGN PATENT DOCUMENTS
EP 0 278 137 8/1988
(Continued)

OTHER PUBLICATIONS

Polesel, A., et al., "Image enhancement via adaptive unsharp masking," IEEE Trans. on Image Processing, vol. 9, No. 3, Mar. 2000.*

(Continued)

*Primary Examiner* — Vu Le
*Assistant Examiner* — Xuemei Chen
(74) *Attorney, Agent, or Firm* — Michael J. Striker

(57) ABSTRACT

The present invention relates to an image processing system, method and computer program for contrast enhancement of images, and more specifically to an improvement of multi-scale adaptive gain control of images. An image processing system (1) for contrast enhancement of an input image is proposed comprising an input module (2) for receiving the input image to be processed, a filtering module (4) operable to locally process the input image by filters of different scales k, whereby for each of the different scales k a locally processed image data and at least one statistic value LSD corresponding to the locally filtered image data is generated, a combining module (5) operable to locally combine the processed image data of the different scales k using a gain function G, thereby generating a contrast enhanced image o, wherein the gain function G is dependent on the statistic value LSD corresponding to the locally processed image data of the respective scale k, and an output module (3) for outputting the contrast enhanced image whereby the gain function G comprises at least one further local dependent correction term a; b; c; d in order to suppress artefacts in the contrast enhanced image.

15 Claims, 4 Drawing Sheets

U.S. PATENT DOCUMENTS

| | | |
|---|---|---|
| 2002/0039152 A1 | 4/2002 | Choi |
| 2002/0181797 A1* | 12/2002 | Young .......................... 382/260 |
| 2003/0117654 A1* | 6/2003 | Wredenhagen et al. ..... 358/3.21 |
| 2004/0136570 A1* | 7/2004 | Ullman et al. ................. 382/114 |
| 2005/0058343 A1* | 3/2005 | Nenonen et al. .............. 382/169 |
| 2006/0013503 A1* | 1/2006 | Kim ............................... 382/276 |
| 2007/0216813 A1* | 9/2007 | Arici et al. .................... 348/630 |
| 2008/0199100 A1* | 8/2008 | Ishiga ........................... 382/263 |
| 2009/0129695 A1* | 5/2009 | Aldrich et al. ................ 382/261 |

FOREIGN PATENT DOCUMENTS

| | | |
|---|---|---|
| EP | 0 280 412 | 8/1988 |
| EP | 0 352 016 | 1/1990 |
| WO | 98/53605 | 11/1998 |
| WO | 01/22726 | 3/2001 |

OTHER PUBLICATIONS

Arici, T., et al., "Image local contrast enhancement using adaptive non-linear filters," IEEE International Conference on Image Processing, Oct. 8-11, 2006.*

K. Schutte: "Multi-Scale Adaptive Gain Control of IR Images" SPIE vol. 3061, pp. 906-914, 1997.

* cited by examiner

IMAGE PROCESSING SYSTEM, METHOD AND COMPUTER PROGRAM FOR CONTRAST ENHANCEMENT OF IMAGES

STATE OF THE ART

The present invention relates to an image processing system, method and computer program for contrast enhancement of images, and more specifically to an improvement of multi-scale adaptive gain control of images.

Images are often obtained, for example by video-cameras, from scenes or objects with non-ideal light conditions and thus suffer from non-ideal luminance distributions. As a result these images comprise details, which in part stay hidden for a human operator, because these details may be placed for example in areas of weak contrast. But the visibility of details also in bad-illuminated areas of an image is of primary importance to ensure customer confidence. Therefore many algorithms are developed and integrated in image processing systems, which provide video signal enhancement in order to accommodate the images for the widely varying light conditions and versatility of the objects or scenes. The task of the image enhancement algorithms is to improve the perception, sharpness and contrast and bring visibility of details in all parts of the scene to the highest possible level.

One part of the image enhancement algorithm belong to the group of the global methods, where one transformation function is applied to all pixels of the input image. Examples for the global methods are stretching or histogram equalization. However there are often more complex situations, where contrast is poor in some parts of the image, but adequate in other parts, or when overall contrast is good, but local contrast low. It is known that in these cases, locally adaptive contrast enhancement will provide significant advantages.

The scientific paper K. Schutte: "Multi-scale adaptive gain control of IR Images", Infrared Technology and applications XXIII, Proceedings of the SPIE Vol. 3061, pp. 906-914 (1997), which appears to be the closest state of the art, is addressed to the issue of locally adaptive contrast enhancement. In the Schutte paper it is recognised that using a single-scale adaptive gain control for contrast enhancement does not fulfil the requirements of detail enhancement in different areas of the images in a sufficient manner. Single-scale means in this connection that the image is processed with a filter with a single size, length or area. As an improvement it is proposed to apply a multi-scale approach, whereby the image is locally processed with filters of different scales. The retrieved data is combined in a weighted manner, whereby the retrieved data of each scale is amplified in dependence on the reciprocal value of the standard deviation of the respective unfiltered data. According to the Schutte paper this approach results in an image showing simultaneously a large range of temperature and a large range of scales without producing artefacts compared to the other methods discussed in the paper.

DISCLOSURE OF THE INVENTION

The present invention is directed to an image processing system with the features of claim 1, a method for contrast enhancement with the features of claim 13 and a computer program with the features of claim 14. Advantageous and/or preferred embodiments are disclosed in the depending claims, the description and/or the figures.

According to the invention the image processing system or apparatus is preferably realised as digital image processing system using a platform in form of a computer system, like a personal computer, DSP, embedded system or the like and provides or is operable to provide contrast enhancement of an input image. The input image is especially embodied as a camera image of a camera system operating preferably in the visible area, but also images of the UV, NIR, IR, FIR wavelength area may be used in connection with the invention. Alternatively the input image is provided as a recorded and/or compressed image.

The image processing system comprises an input module for receiving the input image to be processed by the image processing system, which is optionally embodied as an input interface.

Furthermore the image processing system comprises a filtering module being operable to filter the input image. The filtering procedure is realised so that the input image is locally processed by filters of different scales. The expression filters of different scales is preferably defined as filters of different lengths, different sizes and/or different high-pass, low-pass and/or band-pass frequencies. For each local area of the input image and for each scale a data set comprising locally processed image data and at least one statistic value corresponding to the locally filtered image data is generated.

A combining module is operable to locally combine the processed image data of the different scales, so that for each local area the respective processed image data is combined. Preferably the combination is carried out by a summation. The combining module is operable to use a gain function for individually amplifying or attenuating the respective processed image data during the combination. The gain function is dependent on the statistic value corresponding to the respective locally processed image data and of the respective scale. As a result locally contrast enhanced image areas are generated, which in the entirety represent a contrast enhanced image, whereby the contrast enhancement is based on a multi-scale adaptive gain control.

The image processing system further comprises an output module for outputting the contrast enhanced image, whereby the output module is preferably realised as an output interface connecting the image processing system with a display, a recording apparatus or with a further image processing system.

According to the invention the gain function comprises a further local dependent correction term in order to suppress artefacts in the contrast enhanced image. Local dependent means that the correction term varies relative to and/or dependent on the signal characteristics of different positions in the input image. The artefacts to be suppressed comprise inter alia ringing artefacts and/or noise artefacts. Preferably the local dependent correction term may modify the gain function in any manner and comprises—but is not restricted to—a separated term in the gain function.

The advantage of the invention in view of the methods as known in the state of the art is that contrast enhancement of images can be significantly improved by introducing a further local dependent correction term, because a priori known information or automatically retrieved information can additionally be used.

In a preferred embodiment of the invention the locally processing of the input image is carried out on a pixel-by pixel basis, wherein each filter of the different scales is applied to a corresponding kernel of the input image comprising the pixel to be processed. In other words, for each pixel of the input image kernels comprising the respective pixel are defined, which are adapted to the size of the filters of the different scales.

In a further preferred embodiment the statistic value is expressed as the local standard deviation of the corresponding locally processed area and/or the kernel and that the gain function is dependent on the reciprocal value of the local standard deviation. Preferably the gain function is proportional or direct proportional to the reciprocal value of the local standard deviation. In this embodiment, the gain function is defined as a hyperbolic and/or hyperbolic-like function.

Mathematically expressed the transfer function without the local dependent corrections term(s) from an input pixel i to an output pixel o can be formulated for example as the following two alternative embodiments:

$$o = i + \sum_{j=1}^{k} \left( M \cdot \frac{C_j}{LSD_j} \right) \cdot (i - m_j)$$

high-pass formula or $$o = i + \sum_{j=1}^{k} \left( M \cdot \frac{C_j}{LSD_j} \right) \cdot (m_j - m_{j+1})$$

band-pass formula

| | |
|---|---|
| o: | input pixel value |
| i: | output pixel value |
| k: | number and index of the scales used |
| M: | global mean of the image to be processed (optional) |
| $m_j$: | local mean of the kernel |
| $C_j$: | constant gain factors that control enhancement level per kernel |
| $LSD_j$: | local standard deviation per kernel |

For a detailed explanation and further features of the above-mentioned formulas reference is made to the Schutte paper mentioned in the introductory part. The complete disclosure of this paper in its entirety is herewith incorporated by reference.

The first part of the formulas under the summation symbol represents the gain function, which is proportional to the reciprocal value of the local standard deviation per kernel. The second part represents the high-pass or the band-pass filtered pixel value, respectively. Thus in the case of the band-pass formula the enhancement action is separated in different bands, so that the different bands are amplified by different gains. Preferably part of the bands or all bands of the band-pass formula are arranged overlap-free. However, other formulas expressing an equivalent of the transfer functions as shown above may alternatively be used.

In a further preferred embodiment the local dependent correction term comprises a local dependent summand term. The values of the local dependent summand term vary in dependence on the global or local characteristics of the image signal and/or on the position of the input image.

In a further preferred embodiment the local dependent correction term comprises an edge correction term, so that the gain function is attenuated in areas of edges in the input image. Additionally or alternatively the gain function is attenuated in areas of sharp transitions of objects, especially when these objects show a low spatial activity and thus low LSD-values, and/or in areas of edges, wherein the LSD-values adjacent to the edges have medium values. The advantage of this embodiment is that the aforementioned areas are critical cases for ringing artefacts and thus an attenuation or reduction of the gain function in these areas allows to suppress artefacts in the contrast enhanced image.

In a advantageous development of the invention the image processing system comprises an edge detecting module operable to detect the edges, especially critical edges, in the input image, whereby the detected edges are used to generate the edge correction term. The detection procedure is embodied as a evaluation means operable to evaluate the results of horizontal, vertical and/or diagonal directed edge-detecting or high-pass-filters. For example in order to detect an isolated edge, the evaluation means checks if energy around edges is distributed in a non-symmetrical fashion, for instance along one axes, or it checks for middle energy edges which have not so high LSD measurement values.

In a practical realisation of the invention the evaluation means evaluates the average and/or the maximum of the absolute differences of the results of two edge-detection or high-pass-filters directed perpendicular to each other. In case of evaluating the average care is taken about edges surrounded by areas having a mid-level LSD value, which might be dangerous especially with respect to ringing artefacts. In case of evaluating the maximum difference large differences between the results of two edge-detectors and/or high-pass filters with orthogonal directions are searched, which especially are interpreted as "lonely edges".

In a further development of the invention the edge correction term comprises a weighting function operable to artificially modify the statistic value corresponding to the areas adjacent to and/or comprising the detected edges in dependence on parameters of the detected edges. This development specifies that the gain function in the edge areas is modified, whereby the modification is achieved by a weighting function, which is dependent from the edge parameters and is applied on the statistic values, especially on the LSD-values. In a preferred embodiment, the edge parameters are defined as the average or the length of the detected edges.

One possible implementation of the weighting function is a look-up-table defining weights for various intervals of the input edge parameters. However, also other mathematical formulations of the weighting function are possible.

It is furthermore preferred embodiment that the weighting function comprises at least or exactly one local maximum or local extremum. For example in case of evaluating the average more weight is given to mid-level average values, than to very small edges with low average values or to large edges with high average values. As a further example in case of evaluating the length of the detected edges more weight is given to edges between a minimum length, for example two pixels, and a maximum length.

In a preferred embodiment of the invention the local dependent correction term comprises a local dependent noise reduction term, which is generated by comparing the input image or the band-pass filtered input image with a noise-reduced or noise-free reference image. Preferably the input image is band-pass filtered, so that DC components like light changes and HF components like system noise is discarded, and/or the reference image is temporally filtered, so that all noise is suppressed as far as possible.

In yet another preferred embodiment the local dependent correction term comprises a local dependent detail enhancement term, which is generated as follows: In a first step the image is locally processed by a high-pass-filter to achieve a high-pass signal. Preferably the high-pass signal is locally calculated over a small area, for example 3 to 5 pixels. In a further step the high-pass signal is evaluated by a gain reduction function, wherein pixels whose absolute amplitude in the high-pass signal are small, especially smaller than a preset noise level, are assigned to a reduced gain and wherein pixels whose absolute amplitude in the high-pass signal are big, especially bigger than a preset threshold level, are assigned to an unreduced gain. The reduction of the gain is always carried out, so that also pixels with very small amplitudes are not cut-off and/or so that the absolute value of the gain is more than 0. From the entirety of the assigned gain, the local dependent detail enhancement term is constructed. This embodiment will potentially reveal some very fine, hidden details in the image by bringing them over the visibility threshold (JND—Just Noticeable Difference), while still introducing still acceptable level of noise.

It shall be clear from the description that the various terms of the local dependent correction term may be used in any combination.

The invention is also directed to a method for contrast enhancement of an input image by image processing with the features of claim 13. In a preferred embodiment the method uses the image processing system as described above and/or defined in any one of the preceding claims. The invention furthermore relates to a computer program with the features of claim 14.

BRIEF DESCRIPTION OF THE DRAWINGS

Further features, aspects and advantages of the present invention are disclosed in the following description and the drawings of preferred embodiments of the invention. The figures show.

EMBODIMENTS OF THE INVENTION

Figure 1:
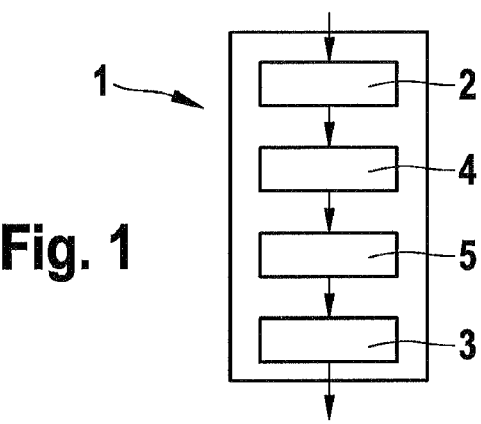
FIG. 1 a block diagram of a first embodiment of a image processing system according to the invention.

FIG. 1 depicts an image processing system 1 as an embodiment of the invention. The image processing system comprises an input module 2 for receiving an input image to be processed and an output module 3 for outputting an contrast enhanced image derived from the input image.

After receiving the input image is transferred to a filtering module 4, which is operable to locally process the input image. More precisely, a set of filters with different scales, i.e. different sizes, is defined and for each pixel of the input image a set of kernels is specified, whereby the size of the kernels is adapted to the size of the filters of the different scales. The size of the kernel is for example between 3×3 pixels and 100×100 pixels. As a result of the filtering procedure for each kernel of each pixel locally processed image data is generated. Additionally the local standard deviation LSD for each kernel of each pixel is calculated.

The locally processed image data together with the LSD-values are transferred to a combining module 5, which is operable to combine the locally processed image data of the different scales referring to one common pixel in weighted manner, wherein the weight assigned to the locally processed image data in dependence on the respective LSD-value. The generating of a contrast enhanced output pixel o from an input pixel i can thus for example be expressed as:

$$o = i + \sum_{j=1}^{k} G(C_j/LSD_j, a, b, c, d) \cdot (i - m_j)$$

or $$o = i \cdot \sum_{j=1}^{k} G(C_j/LSD_j, a, b, c, d) \cdot (m_j - m_{j+1})$$

The formula shows a summation over k scales. The term G describes a gain function, which is dependent on a constant factor $C_j$, the local standard deviation $LSD_j$ and local dependent correction terms a, b, c and d. However, more or less correction terms may be used.

$m_j$ stands for the local mean within the kernel with the index j, so that the term $(i-m_j)$ represents the high-pass filtered value of the respective pixel or the term $(m_j-m_{j+1})$ represents the band-pass filtered value of the respective pixel. Improvement of the image is already obtained by amplifying medium and higher frequencies in the image by gain that is inversely proportional to the local standard deviation LSD, so that areas which have low level of details will be amplified more to make them visible.

In one preferred realisation one of the local dependent summand terms is a local dependent offset for the gain function. In a simplified manner the gain function may also be expressed as G=(C/LSD)+a, whereby still nearly the same gain is provided for low LSD values but the gain is significantly reduced for high LSD values. Especially in case of a<0 less gain is given to pixels with higher LSD values and vice versa. As especially visible artefacts are mainly introduced by gains on areas where the LSD-values are relatively high, the reduction of gain in this areas contributes to the reduction of the visible artefacts. The advantage of implementing the local dependent summand term is thus that especially for negative a-values ringing artefacts and/or excessive over/under-shoots of the signal can be effectively reduced while still leaving the gain of areas with low LSD-values nearly unaffected. It is also possible to increase the constant gain factors C, thus increasing the gain of low-LSD areas and simultaneously decrease the gain for high-LSD areas by using the local dependent summand term. The values of the local dependent summand term may be set on basis of a priori knowledge of features of the image or may be calculated automatically.

Alternatively and in order to suppress further artefacts the gain can also be expressed in a simplified manner as G=max [(C/LSD)+a, $C_{min}$/LSD], whereby $C_{min}$ corresponds to a minimum preset gain factor which will still be applied to a pixel.

After processing each pixel a contrast enhanced image is generated and transferred to the output module 3.

Figure 2A:
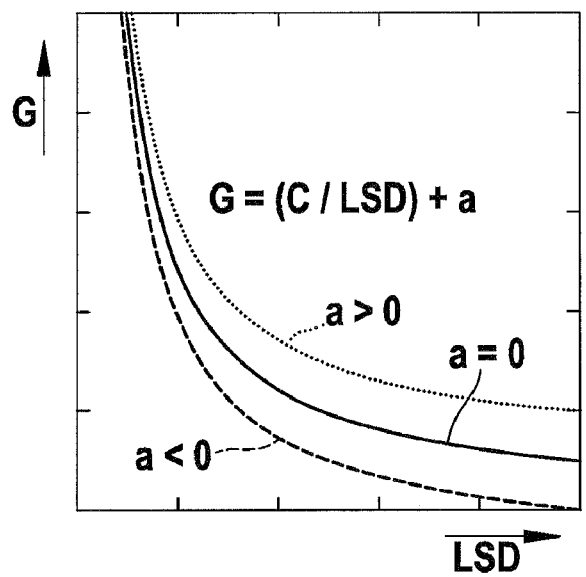
FIG. 2a, b graphs illustrating the behaviour of the gain function in the first embodiment while using a local dependent correction term.

FIGS. 2a and b both illustrate the behaviour of the gain function G in dependence on the LSD-value, in case the correction term is expressed as a local dependent summand term a. "Local dependent" means that the correction term may for example also be written as a(x,y), whereby x and y indicate a position in the input image and whereby the value of a is not constant over all positions in the input image but is dependent on the signal characteristics of different positions in the input image.

According to FIG. 2a the local dependent summand term particularly concentrates on the gain behaviour for the large values of LSD. If a<0 less gain is given to pixels with higher LSD values and vice versa. C is constant for all three shown curves in FIG. 2a. The underlying idea is that—if needed—a can be set negative to reduce gain for the large values of LSD and thus control perceived sharpness and prevent ringing in the output image.

Figure 2B:
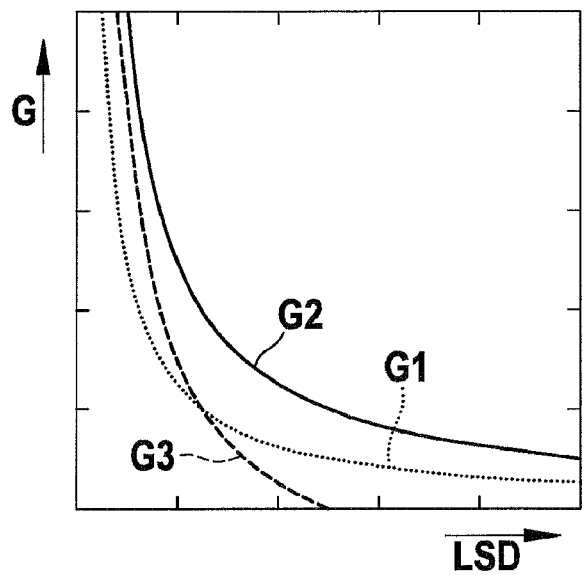

FIG. 2b shows that in varying the constant factor C (or $C_j$) together with the summand term a the hyperbolic or hyperbolic-like gain function G can be adapted. Curve G1 shows the course of the gain function G with the summand term a=0. Curve G2 shows the situation, when the constant factor C is two times larger compared to G1, whereby the summand term a is still set 0. It can be seen that the gain is significantly increased for large LSD-values. Curve G3 shows the situation, when the constant gain factor C is still set as in curve G2, but a negative summand term a, a<0, is used. As it can be observed, no excessive gain for the higher LSD-values is introduced, so that the gain for small LSD-values is increased and for large LSD-values decreased.

Figure 3:
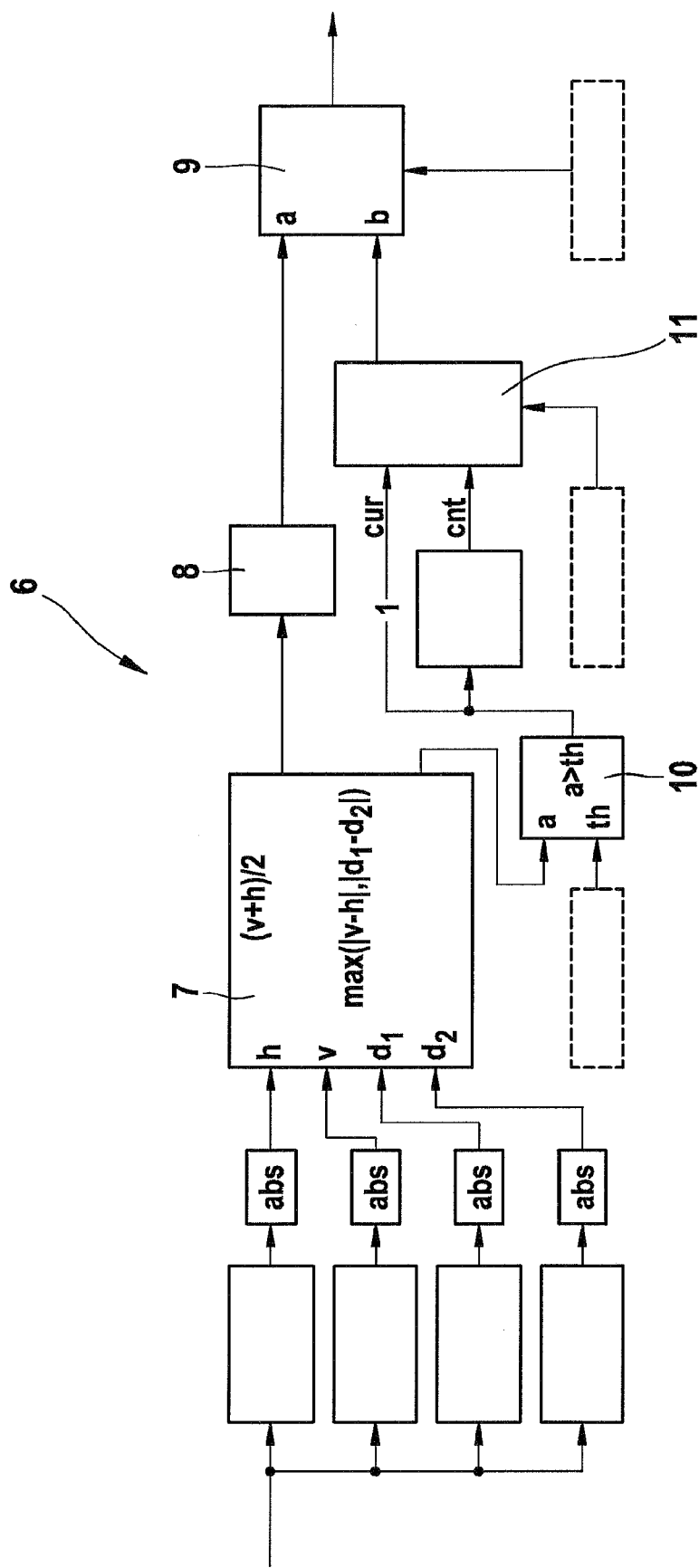
FIG. 3 a block diagram of a module for generating an edge correction term for the gain function of the first embodiment.

It was observed that often critical cases for the ringing artefacts are at the very sharp transitions of two objects, particularly when the objects are with low spatial activity. Furthermore problems were recognised for edges with average LSD. In order to overcome these and further critical cases an edge correction term b is optionally introduced into the gain function. The calculation of the edge correction term b will be explained with reference to FIG. 3, which shows an edge detecting module 6 as a block diagram.

The edge detection module 6 receives the input image as an image signal, which is filtered by a horizontal, a vertical, a 45 degree and a 135 degree high-pass (HP) filter. Alternatively, edge-detection-filters with other directions may be used. In a next step the absolute values of the filtered signals h, v, d1 and d2, respectively are determined and transferred to a calculating unit 7.

In the calculating unit 7 the average value of the filtered signals v and h—creating the signal edge_sum—and the maximum difference between the signals h and v and/or the signals d1 and d2—creating the signal edge_dif—are calculated. In general the signal edge_dif can be also constructed in any other way, such that it represents a measure for the asymmetry of edge signals in different directions. The two calculated signals are guided into two different signal branches for detecting edges with average LSD (edge_sum) and edges of sharp transitions or "isolated edges" (edge_dif) as it will be explained as set forth:

In a next step in the first branch the signal edge_sum is mapped onto an edge_a signal in the module Sum LUT 8, whereby for example the following look-up-table is used:

| Sum LUT | |
| --- | --- |
| edge_sum | edge_a |
| <b1 | 0 |
| >=b1, <b2 | x/4 |
| >=b2 < b3 | X |
| >=b3 | x/2 |

The idea is that middle size edges can also be dangerous with respect to the ringing artefact in certain places, so more weight is given to them than to very small or very big edges. Constants b1<b2<b3 correspond to the edge signal values edge_sum, x=const. The edge_a signal is then guided into the combine module 9, wherein—under certain conditions as explained later on—the edge_a signal is combined with an edge_b signal.

In the second branch in a first step a threshold setting COUNT_THR reduces noise influence for low detail areas, wherein it is checked if an edge_dif signal (or parts thereof) is large enough so that a possible relevant edge is an isolated edge along one dimension. In case the signal edge_dif is larger than the threshold value the signal is passed unmodified (gain=1), otherwise the signal edge_dif is set=0. In a next step a FIR filter 10 is applied. With this step it is checked if a considered lonely edge is of a certain length, therefore the length is counted over a horizontal window (FIR filter). However, other methods for determining the length of the edge may be implemented.

The result is shaped in a Count LUT 11, whereby for example the following look-up-table is used:

| Count LUT | | |
| --- | --- | --- |
| cnt | cur | edge_b |
| <2 | 1 | 0 |
| >=2, <=EDGE_LUT | 1 | x |
| >EDGE_LUT | 1 | 0 |
| any | 0 | 0 |

As a result all such detected edges (if current pixel is such an edge, cur=1) with length from 2 (predetermined minimum value) to EDGE_LUT (predetermined maximum value) are assigned to x=const in the edge_b signal. The edge_b signal is output to the combine module 9, wherein—also under certain conditions—the edge_b signal is combined with the edge_a signal.

The combine module 9 generates an edge signal by combining the edge_a and edge_b signals for example according to the following look-up-table:

| Combine function | |
| --- | --- |
| Edge_mode | edge |
| 0 | A |
| 1 | B |
| 2 | Max(a, b) |
| 3 | (a + b)/2 |
| 4:7 | (a + b), preferably limited to a preset max. value |

The combination may be set automatically or manually. The resulting edge signal is used as the local dependent correction term b for the gain function G, wherein the LSD distribution is modified as follow: The modified LSD distribution is calculated by convolving the edge signal with the LSD-values. LSD_mod=convolve(edge+LSD), where convolve preferably corresponds to horizontal convolution (FIR filtering in the kernel support to smoothen results and not introduce LSD/gain jumps).

As a result the first branch deemphasizes all edges with a mid level as specified in the Sum LUT above. The second branch determines if energy around edges is distributed in a non-symmetric fashion, for instance along the axes, and reduces gain along the axes, so that preferably the gain is reduced symmetrically around these edges. The advantage of the edge correction term b is that $C_j$ gains can be set much higher—possibly allowing better detail visibility—and the proposed algorithm will reduce them only on the places where it is needed.

Figure 4A:
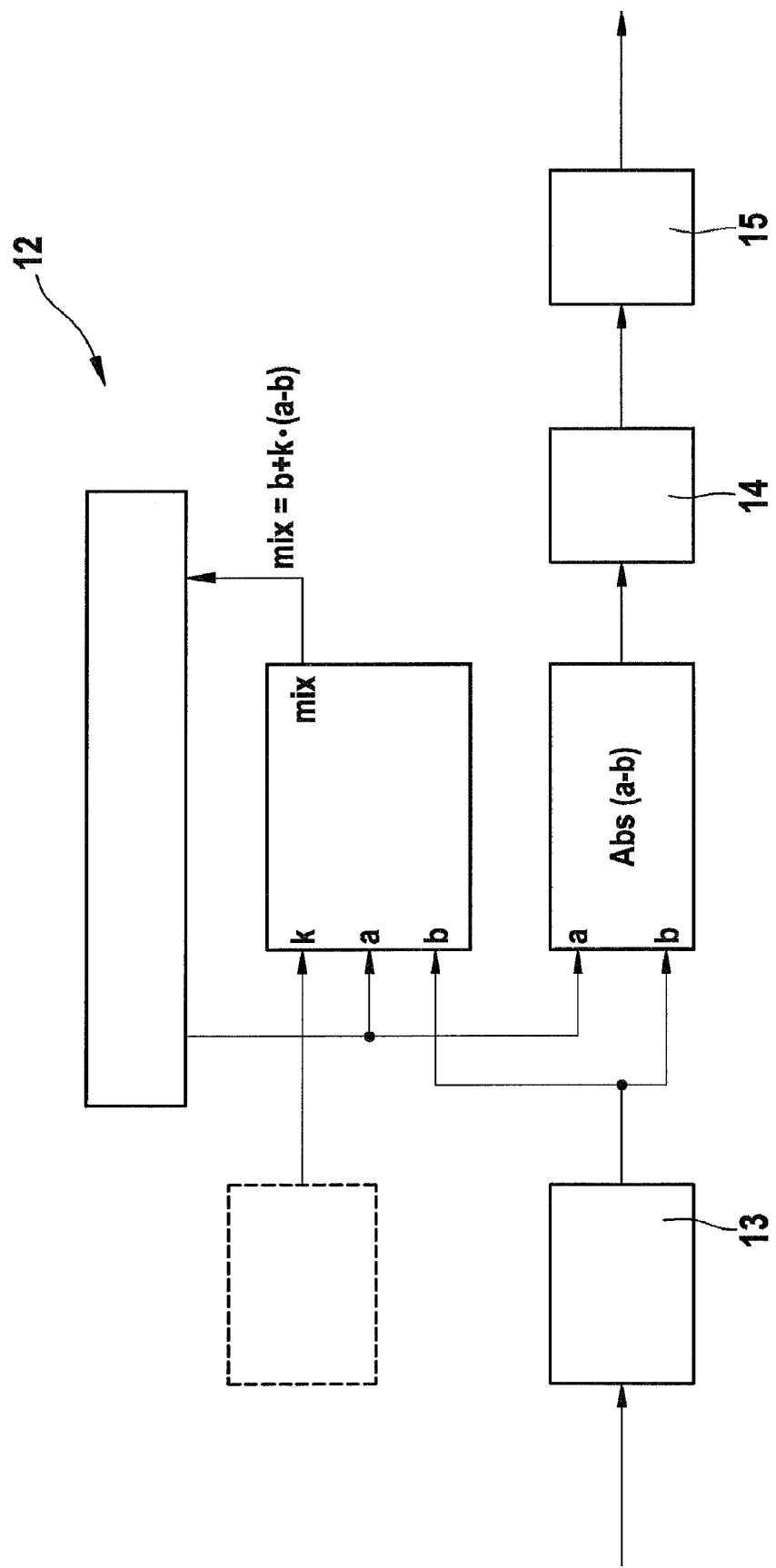
FIG. 4a,b a block diagram of a module for generating a local dependent noise reduction term for the gain function of the first embodiment.
Figure 4B:
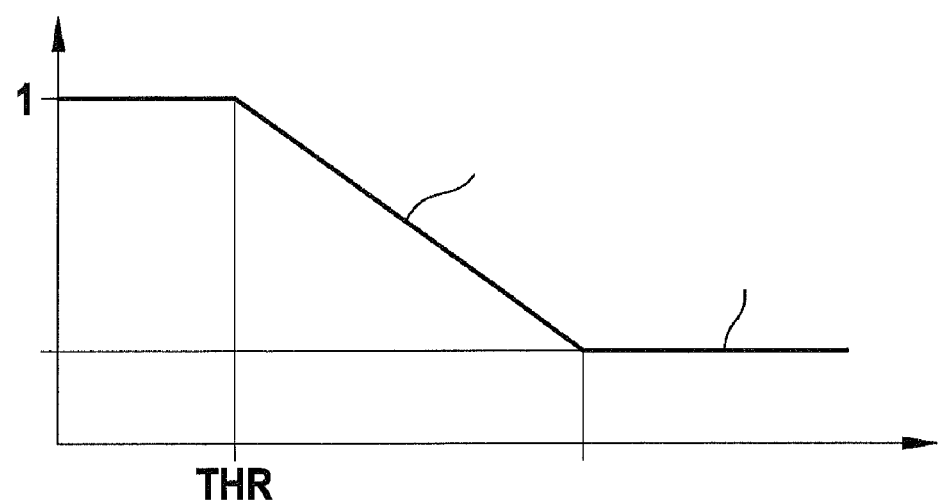

Referring now to FIGS. 4a and 4b the calculation of a local dependent noise reduction term c as a further correction term in the gain function G will be explained. FIG. 4a shows a noise detection module 12, which delivers an output signal that is a quantification of the amount of noise locally present in the input image signal. The measurement method used is comparing the input signal with a temporally filtered version of the video input, i.e. noise free image: In a first step a band pass filter 13 emphasises the frequency area of the input video signal where noise is most relevant, namely discarding DC-components like light changes and HF components like system noise. In a second step the absolute difference between a field memory output, in which a noise free image is stored, and the output of the band pass filter 13 is calculated as a measure for the amount of noise. The noise free image is generated by recursive filtering of the band pass filtered input video signal as it can be seen in FIG. 4a. However, other methods for generating a noise free or noise reduced reference image may be employed. The absolute difference signal is fed into a FIR filter 14, which widens this signal to apply local gain reduction in a smooth way across the image. A transfer module 15 generates the local dependent noise reduction term c or the equivalent thereof as an actual gain reduction depending on the amount of detected noise.

An example of the transfer function used in the transfer module 15 is given in FIG. 4b showing the dependency between gain reduction and noise level. It is possible to set several parameters like THR (noise threshold below which no gain reduction is applied, i.e. gain reduction is equal to 1), SLOPE and LOW_GAIN, which represents the maximum gain reduction for pixels with high level of noise and has a value less or equal to 1.

Figure 5:
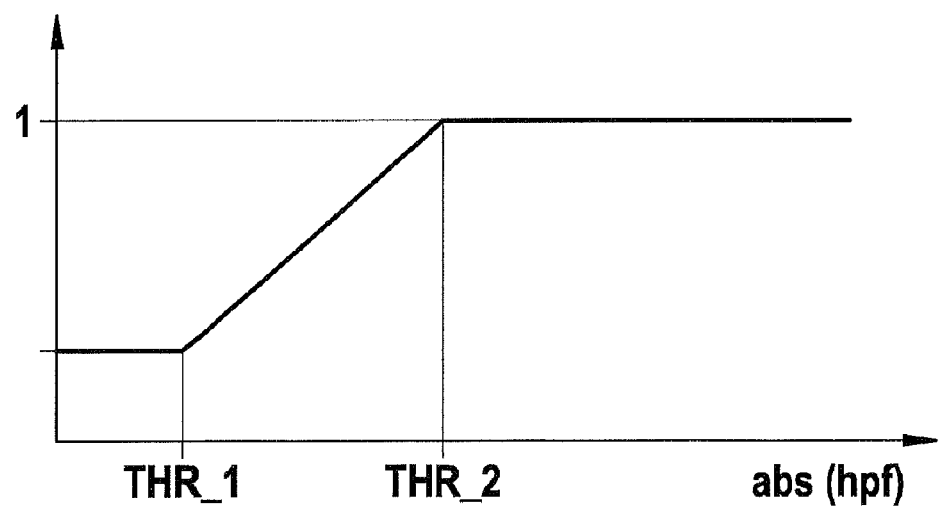
FIG. 5 a graph of a gain reduction function, which is used to generate a local dependent detail enhancement term for the gain function of the first embodiment.

FIG. 5 depicts a graph of a gain reduction function, which is used to generate a local dependent detail enhancement term d for the gain function G of the first embodiment of the invention. The motivation for the local dependent detail enhancement term d is that noise is the most visible and annoying in the flat, low-detailed areas. The LSD measurement can find sufficient amount of details in the flat regions, if part of the kernel is lying over object edges or some detail area. What usually happens, especially without local correction terms in the gain function, is that pixel's LSD measurement especially for the larger kernels is big enough not to be considered noise and still small, therefore receiving very high gain and amplifying overall present noise considerably. To overcome this problem the local dependent detail enhancement term d is proposed, which is constructed as follows. In a first step the local values of a high-pass signal is checked and gain is reduced for pixels whose amplitude values of the high-pass signal are very small, i.e. below a predetermined noise level. It shall be underlined that the small signals are not put to zero, because they can still be details, but instead a gain is assigned that is more appropriate to the type of image used or the acceptable noise level in the image (CORE-LVL). This approach has the advantage that potentially some very fine, hidden details in the image will be revealed by bringing them over the visibility threshold (Just Noticeable Difference), while introducing still acceptable level of noise. An example of a respective transfer function is shown in FIG. 5, where input signal is absolute value of the high-pass signal calculated over very small area (3 to 5 pixels for instance). Additionally it can also be filtered version (FIR filter with length of max 3 pixels) to smoothen this gain reduction action in the spatial domain If the input signal (amount of details) is higher than threshold THR_2, no gain reduction is performed (gain reduction is 1), otherwise gain reduction is performed. The value CORE-LVL (value<=1) controls minimum gain still applied for very small (fine) details.

The invention claimed is:

1. Image processing system (1) for contrast enhancement of an input image comprising
    an input module (2) for receiving the input image to be processed,
    a filtering module (4) operable to locally process the input image by filters of different scales (k), whereby for each of the different scales (k) a locally processed image data and at least one statistic value corresponding to the locally filtered image data is generated,
    a combining module (5) operable to locally combine the processed image data of the different scales (k) using a gain function (G), thereby generating a contrast enhanced image (o), wherein the gain function (G) is dependent on the at least one statistic value corresponding to the locally processed image data of the respective scale (k), and
    an output module (3) for outputting the contrast enhanced image characterised in that the gain function (G) comprises at least one further local dependent correction term in order to suppress artefacts in the contrast enhanced image, the local dependent correction term comprising an edge correction term (b) for attenuating the gain function (G) in areas of the input image adjacent to and/or comprising edges.

2. Image processing system (1) according to claim 1, characterised in that the locally processing of the input image is realised on a pixel-by-pixel basis, wherein each filter of the different (k) scales is applied to a corresponding kernel of the input image comprising the pixel to be processed.

3. Image processing system (1) according to claim 1, characterised in that the at least one statistic value is realised as a local standard deviation (LSD) of the locally processed area and/or the kernel and that the gain function (G) is dependent on the reciprocal value of the local standard deviation.

4. Image processing system (1) according to claim 1, characterised in that the local dependent correction term further comprises a local dependent summand term (a), which is preferably realised as a look-up-table.

5. Image processing system (1) according to claim 1 further comprising an edge detecting module (6) operable to detect edges in the input image by evaluating the results of horizontal, vertical or diagonal directed high-pass-filters and or combinations thereof.

6. Image processing system (1) according to claim 5, characterised in that the edge detecting module (6) is operable to detect edges by evaluating the average and/or the maximum differences of the results of two high-pass-filters directed perpendicular to each other.

7. Image processing system (1) according to claim 1, characterized in that the edge correction term (b) comprises a weighting function operable to artificially modify the at least one statistic value corresponding to the areas adjacent to and/or comprising the detected edge in dependence of parameters of the detected edges.

8. Image processing system (1) according to claim 7, characterised in that the parameters of the detected edges are realised as the average or the length of the detected edges.

9. Image processing system (1) according to claim 7, characterised in that the weighting function is embodied as a look-up-table or a mathematical function.

10. Image processing system (1) for contrast enhancement of an input image comprising
    an input module (2) for receiving the input image to be processed, a filtering module (4) operable to locally process the input image by filters of different scales (k) whereby for each of the different scales (k) a locally processed image data and at least one statistic value corresponding to the locally filtered image data is generated, a combining module (5) operable to locally combine the processed image data of the different scales (k) using a gain function (G), thereby generating a contrast enhanced image (o), wherein the gain function (G) is dependent on the at least one statistic value corresponding to the locally processed image data of the respective scale (k), and an output module (3) for outputting the contrast enhanced image characterised in that the gain function (G) comprises at least one further local dependent correction term in order to suppress artefacts in the contrast enhanced image, comprising a local dependent noise reduction term (c) generated by comparing the input image or the band-pass-filtered input image with a temporally filtered noise-reduced or noise-free reference image.

11. Image processing system (1) for contrast enhancement of an input image comprising an input module (2) for receiving the input image to be processed, a filtering module (4) operable to locally process the input image by filters of different scales (k), whereby for each of the different scales (k) a locally processed image data and at least one statistic value corresponding to the locally filtered image data is generated, a combining module (5) operable to locally combine the processed image data of the different scales (k) using a gain function (G), thereby generating a contrast enhanced image (o), wherein the gain function (G) is dependent on the at least one statistic value corresponding to the locally processed image data of the respective scale (k), and an output module (3) for outputting the contrast enhanced image characterised in that the gain function (G) comprises at least one further local dependent correction term in order to suppress artefacts in the contrast enhanced image, comprising a local dependent detail enhancement term (d) generated by applying a high-pass-filter to the input image and evaluating the high-pass-filtered image with a gain reduction function.

12. Method for contrast enhancement of an input image by image processing preferably using the system (1) according to claim 1, comprising the steps:

locally processing the input image by filters of different scales, thereby generating for each of the different scales a locally processed image data and at least one statistic value corresponding to the locally filtered image data;

locally combining the processed image data of the different scales comprising the use of a gain function, which individually reduces and/or increases a gain factor for each processed image data, wherein the gain function and/or the gain factor is set dependently on the at least one statistic value corresponding to the locally processed image data of the respective scale characterised in that the gain function comprises at least one further local dependent correction term in order to suppress artefacts in the contrast enhanced image.

13. A non-transitory computer-readable medium encoded with a computer program comprising program code means for performing all the steps of claim 12 when said computer program is run on a computer and/or on the image processing system.

14. Image processing system (1) for contrast enhancement of an input image comprising an input module (2) for receiving the input image to be processed, a filtering module (4) operable to locally process the input image by filters of different scales (k), whereby for each of the different scales (k) a locally processed image data and at least one statistic value corresponding to the locally filtered image data is generated, a combining module (5) operable to locally combine the processed image data of the different scales (k) using a gain function (G), thereby generating a contrast enhanced image (o), wherein the gain function (G) is dependent on the at least one statistic value corresponding to the locally processed image data of the respective scale (k), and an output module (3) for outputting the contrast enhanced image characterised in that the gain function (G) comprises further local dependent correction terms in order to suppress artefacts in the contrast enhanced image, the local dependent correction terms comprising at least one of the group consisting of:

an edge correction term for attenuating the gain function (G) in areas of the input image adjacent to and/or comprising edges;

a local dependent noise reduction term, wherein the local dependent noise reduction term is generated by comparing the input image or the band-pass-filtered input image with a temporally filtered noise-reduced or noise-free reference image; and a local dependent detail enhancement term, wherein the local dependent detail enhancement term is generated by applying a high-pass-filter to the input image and evaluating the high-pass-filtered image with a gain reduction function.

15. Image processing system (1) according to claim 14, characterised in that the local dependent correction terms further comprises a local dependent summand term, which is preferably realised as a look-up-table.

* * * * *